"Patented Apr. 28, 1953" 2,636,897

UNITED STATES PATENT OFFICE 2,636,897

N-OXYALKYL-P-AMINOBENZOATE COMPOUNDS

David I. Weisblat and Barney J. Magerlein, Kalamazoo, Mich., assignors to The Upjohn Company, Kalamazoo, Mich., a corporation of Michigan No Drawing. Application August 19, 1950,
Serial No. 180,501

15 Claims. (Cl. 260—470)

The invention relates to new N-oxyalkyl-p-aminobenzoate compounds, particularly to such compounds wherein the oxyalkyl group is a 2-oxypropyl group which may or may not have an alkyl substituent on the third carbon atom thereof, and to a method useful in their preparation.

The N-oxyalkyl-p-aminobenzoate compounds of the invention have the generic formula

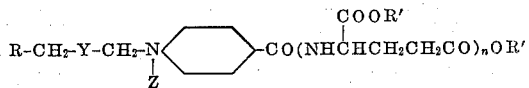

N-oxyalkyl-p-aminobenzoate compound wherein R' is a member of the class consisting of hydrogen and the alkyl radicals, $n$ is a member of the class consisting of zero and the positive integers 1 to 7, inclusive, Z is a member of the class consisting of hydrogen and the arylsulfonyl radicals, R is a member of the class consisting of hydrogen and the alkyl radicals and Y is a member of the class consisting of radicals having the formulae —CHOH— and —CO—. The new compounds of the invention thus include the N-(2-hydroxyalkyl)-p-aminobenzoate ester compounds having the Formula IV given hereinafter and the corresponding acids and also the N-(2-ketoalkyl)-p-aminobenzoate compounds having the Formulae V and VI.

In the naming of the compounds of the invention, and of other compounds mentioned herein, when both a glutamic acid residue and a p-aminobenzoic acid residue are included in the molecule, the nitrogen atom of the glutamic acid residue is, for convenience, herein referred to by the symbol N' and the nitrogen atom of the p-aminobenzoic acid residue is referred to by the symbol N. As indicated in the generic formula given, compounds containing more than one glutamic acid or ester residue contemplated by the invention are those wherein only the gamma carboxyl groups are involved in the peptide linkages. Preferred compounds, however, are those wherein $n$ of the generic Formula I is the integer 1.

Compounds having the generic Formula I given above are useful as intermediates in the preparation of compounds similar to or identical with certain naturally occurring compounds of the folic acid group. Thus, as described and claimed in concurrently filed copending application, Serial No. 180,509, diethyl N'-(N-(2-ketopropyl)-N-(p-toluenesulfonyl)-p-aminobenzoyl)-glutamate can be oxidized with selenium dioxide to form diethyl N'-(N-(2-formyl-2-ketoethyl)-N-(p-toluenesulfonyl)-p-aminobenzoyl)-glutamate which can in turn be condensed with 2,4,5-triamino-6-hydroxypyrimidine as described and claimed in copending application, Serial No. 63,454, filed December 3, 1948, to form diethyl N'-(N-((2-amino-4-hydroxy-6-pteridyl)-methyl)-N-(p-toluenesulfonyl)-p-aminobenzoyl)-glutamate. The latter compound upon treatment with anhydrous hydrogen bromide in an aliphatic acid medium, and in the presence of a bromine acceptor to prevent bromination of the benzene nucleus of the p-aminobenzoic acid residue according to the method described and claimed in copending application, Serial No. 41,883, filed July 31, 1948, and after subsequent hydrolysis of the ester groups, is converted to N'-(N-((2-amino-4-hydroxy-6-pteridyl)-methyl)-p-aminobenzoyl)-glutamic acid (pteroylglutamic acid) generally recognized, when the glutamic acid residue has the same configuration as 1(+) glutamic acid, as being identical with the "L. casei factor," or vitamin Bc from liver, sometimes referred to as "folic acid." When N'-(N-(2-formyl-2-ketoethyl)-p-aminobenzoyl)-glutamic acid is condensed with 2,4,5-triamino-6-hydroxypyrimidine, pteroylglutamic acid is formed directly without the necessity of splitting the toluenesulfonyl radical from the product or of hydrolyzing ester groups. In similar fashion other N-(2-ketoalkyl)-p-aminobenzoate compounds wherein Z of the formula given is an arylsulfonyl radical can be oxidized and the product condensed with 2,4,5-triamino-6-hydroxypyrimidine to form other compounds of the folic acid type. The N-(2-hydroxyalkyl)-p-aminobenzoate compounds are, as is herein described, useful in the preparation of the N-(2-ketoalkyl)-p-aminobenzoate compounds and hence of the above mentioned folic acid compounds.

Compounds of the generic formula previously given wherein Z represents an arylsulfonyl radical are preferred compounds of the invention and are of particular value because of the protection afforded the aromatic amino group by the arylsulfonyl group. Compounds having the amino group thus protected are not as subject to decomposition and the formation of by-products when employed as a reactant, e. g. when the hydroxy compounds are oxidized with chromic acid and when the keto compounds are condensed with 2,4,5-triamino-6-hydroxypyrimidine, to nearly the same extent as are compounds in which the aromatic amino group is unprotected.

Although the invention is described in the case of the arylsulfonyl compounds with particular reference to p-toluenesulfonyl compounds, it is to be understood that the invention contemplates compounds and intermediates containing other arylsulfonyl radicals, such as the o-toluenesulfonyl, benzenesulfonyl, and naphthalenesulfonyl radicals as well as many others. Arylsulfonyl radicals having substituents, such as chlorine, bromine or nitro groups and others, on the aromatic nucleus can also be used, provided only that the substituent is non-reactive under the reaction conditions. It should be mentioned that the method involved in the present invention can be carried out and the corresponding intermediate and final compounds prepared using starting compounds wherein the arylsulfonyl group is replaced by an alkylsulfonyl, aralkylsulfonyl, or cycloalkylsulfonyl group such as the methanesulfonyl, alpha-toluenesulfonyl or cyclohexysulfonyl radicals, respectively.

A preferred arylsulfonyl radical is the p-toluenesulfonyl radical because the compounds formed are generally well-defined crystalline solids and because it has been found that higher yields of amines are often formed when the p-toluenesulfonylamino compound is split than when certain other arylsulfonyl derivatives of the same amino compound are split.

Although amino benzoic acid ester or glutamic acid ester residues present in the ester compounds prepared by the method of the invention can comprise an alkyl ester, such as the methyl, ethyl, n-propyl, iso-propyl, n-butyl, tert.-butyl, amyl, lauryl, dodecyl and many other alkyl esters, the preferred esters are those having less than 8 carbon atoms in the alkyl radical, particularly the ethyl ester, due to matters of convenience and economy.

Although the invention is directed particularly to alkyl esters, the process of the invention can also be carried out and the corresponding compounds prepared using other esters, such as the phenyl, tolyl, xylyl, cyclohexyl, benzyl and many other aryl, aralkyl or cycloalkyl esters.

Although the invention will be described with particular reference to compounds containing the 2-oxypropyl radical, it is to be understood that compounds containing other 2-oxyalkyl radicals, such as the 2-ketobutyl, 2-hydroxybutyl, 2-ketopentyl, 2-hydroxypentyl, 2-ketoheptyl, 2-hydroxyheptyl radicals and others, are also included within the scope of the invention. The preferred compounds are, however, the N-(2-hydroxypropyl)-p-aminobenzoate compounds and the N-(2-ketopropyl)-p-aminobenzoate compounds previously mentioned.

$$R-CH_2-CH-CH_2$$
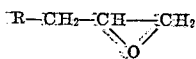

II
Epoxyalkane
+

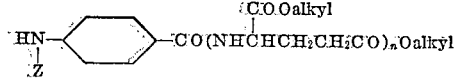

III
p-aminobenzoate ester compound

| Tertiary amine

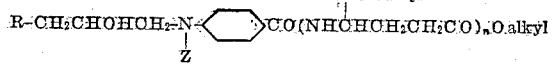

IV
N-(2-hydroxyalkyl)-p-aminobenzoate ester compound

| Oxidation (with or without hydrolysis before or after oxidation step)
(when Z=arylSO$_2$)

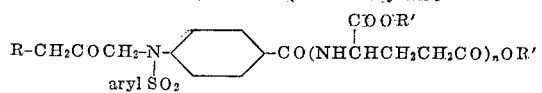

V
N-(2-ketoalkyl)-p-aminobenzoate compound wherein Z=arylSO$_2$

| HBr

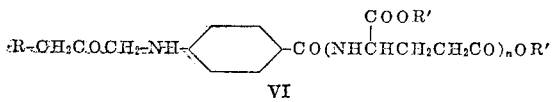

VI
N-(2-ketoalkyl)-p-aminobenzoate compound wherein Z=H

The N-oxyalkyl-p-aminobenzoate compounds (I) can be prepared readily, as indicated in the accompanying reaction chart wherein R', n, Z, R and Y have the values previously given, by reacting an epoxyalkane having the Formula II with a p-aminobenzoate ester compound having the Formula III to form an N-(2-hydroxyalkyl)-p-aminobenzoate ester compound (IV) of the invention. An N-(2-hydroxyalkyl)-p-aminobenzoate compound (IV) in which Z is hydrogen can be converted readily to its arylsulfonyl derivative, i. e. to an N-(2-hydroxyalkyl)-p-aminobenzoate compounds (IV) in which Z is an arylsulfonyl radical by reaction with an arylsulfonyl halide in conventional manner. Also, the arylsulfonyl compounds can be converted readily to the corresponding free amines by treatment with hydrogen bromide according to the method of the copending application previously referred to. Alkyl esters having the Formula IV can be hydrolyzed readily to the corresponding acids with dilute alkali.

Oxidation of an N-(2-hydroxyalkyl)-p-aminobenzoate ester compound (IV), or of the corresponding acid, wherein Z is an arylsulfonyl radical, preferably with a chromic compound, i. e. with chromic anhydride or with an acid solution of a dichromate, converts the —CHOH— group smoothly to a —CO— group with the formation of an N-(2-ketoalkyl)-p-aminobenzoate compound (V) wherein Z is an arylsulfonyl radical. The latter compound can be converted readily with hydrogen bromide by the method of the copending application previously mentioned to the free amine, i. e. to an N-(2-ketoalkyl)-p-aminobenzoate compound (VI) wherein Z is hydrogen.

Epoxyalkanes (II) which can be used in the process of the invention are the 1,2-epoxypropanes and the 1,2-epoxy-3-alkylpropanes, i. e. the substituted 1,2-epoxypropanes wherein the substituent is an alkyl radical attached to the third carbon atom of the propane carbon chain. Epoxyalkanes which can be used in the process include, among others, 1,2-epoxy propane, 1,2-epoxy-3-methyl-propane, 1,2-epoxy-3-ethyl-propane, 1,2-epoxy-3-propyl-propane, 1,2-epoxy-3-isopropyl-propane and 1,2-epoxy-3-tertiary-butyl-propane. The preferred epoxyalkane is 1,2-epoxypropane.

Among the p-aminobenzoate compounds (III) which can be used in the process of the invention are included ethyl p-aminobenzoate, diethyl N'-(p-aminobenzoyl)-glutamate, triethyl N'-(p-aminobenzoyl)-glutamyl-glutamate, their N-arylsulfonyl derivatives and many others.

A p-aminobenzoate compound (III) wherein $n$ is an integer from the group 1 to 7, inclusive, can be obtained as described and claimed in application, Serial No. 41,888. According to the method of the copending application, a p-aminobenzoate compound having one glutamic acid residue in the molecule is prepared by reacting glutamic acid or an alkyl ester thereof with an arylsulfonyl-p-aminobenzoyl halide or with a p-nitrobenzoyl halide. The halides referred to in this connection are the chlorides and bromides. When a p-nitrobenzoyl halide is used, an N'-(p-nitrobenzoyl)-glutamic acid or ester is first obtained which, upon reduction, e. g. with hydrogen using platinum oxide as a catalyst, yields an N'-(p-aminobenzoyl)-glutamic acid or ester. The latter compound can be converted readily by means of an arylsulfonyl halide to an N'-(N-(arylsulfonyl)-p-aminobenzoyl)-glutamic acid or ester. When an arylsulfonyl-p-aminobenzoyl halide is reacted with glutamic acid or its ester, an N'-(N-(arylsulfonyl)-p-aminobenzoyl)-glutamic acid or ester is formed directly. The N'-(p-aminobenzoyl)-glutamic acid and the N'-(N-(arylsulfonyl)-p-aminobenzoyl)-glutamic acids can be converted to the corresponding alkyl esters, e. g. by treatment with an alkanol and an esterification catalyst. In similar manner, other p-aminobenzoate compounds can be prepared having up to seven glutamic acid residues in the molecule by starting with the corresponding gamma-glutamyl-glutamic acids or esters containing the requisite number of peptide linkages.

The reaction of an epoxyalkane with a p-aminobenzoate ester compound (III) is carried out conveniently by heating a mixture of the compounds containing a catalytic proportion, usually about 2 per cent or somewhat less of the weight of the mixture, of a tertiary amine, such as pyridine, quinoline, triethylamine, tributylamine and the like. Heating is usually carried out at from about 80° C. to about 150° C. for from a few minutes to a few hours or longer, although the degree and time of heating are not critical other than to assure substantial progression of the reaction. The reaction proceeds smoothly and without the formation of undue amounts of by-products. Inert diluents can be employed, if desired, although they are not usually necessary. When a low boiling constituent is present in the reaction mixture the heating can be carried out under pressure if desired.

Following the heating step, the entire reaction mixture can be diluted with benzene, ether or other suitable solvent for the N-(2-hydroxyalkyl)-p-aminobenzoate ester compound and the solution washed with dilute mineral acid to remove the tertiary amine. The washed solution can then be dried, e. g. with anhydrous sodium sulfate or by distilling to remove water, and the solvent evaporated to obtain the N-(2-hydroxyalkyl)-p-aminobenzoate ester compound as a residue which is generally oily in nature. The ester is hydrolyzed readily by stirring it with dilute alcoholic alkali until it dissolves, acidifying the solution and collecting and drying the precipitated acid. The acids are often crystalline. The N-(2-hydroxyalkyl)-p-aminobenzoate compounds are generally thus obtained in a form sufficiently pure for further use but they can be purified further if desired either by chromatography or by crystallization from alcohol or from a mixture of ether and hexane, or in any other convenient way.

The oxidation of an N-(2-hydroxyalkyl)-p-aminobenzoate compound wherein Z in the formula given is an arylsulfonyl radical, and wherein the compound is either an ester or the free acid, can be carried out conveniently by dissolving the hydroxyalkyl compound and chromic anhydride in glacial acetic acid or other suitable solvent and allowing the mixture to stand for several hours at about room temperature or somewhat below, preferably with gentle agitation. The mixture which is formed generally consists of a liquid and a solid portion from which the N - (2 - ketoalkyl) - p - aminobenzoate compound can be recovered in any convenient way, e. g. by stirring the mixture with ether and filtering or by diluting with water and extracting with benzene or ethyl acetate. In either case a solution of the ketoalkyl compound in an organic liquid is obtained which can be washed free of inorganic salts and water-soluble acids and then dried and the solvent distilled under reduced pressure. The N-(2-ketoalkyl)-p-aminobenzoate compound is thus obtained as a yellowish sirupy or solid residue depending, generally, upon whether it is an ester or a free acid. Oxidation of an N-(2-hydroxyalkyl)-p-aminobenzoate compound wherein Z of the formula given is hydrogen yields the corresponding 2-ketoalkyl compound in very low yield.

The oxidation can also be carried out in accordance with the method described and claimed in concurrently filed, copending application Serial No. 180,507, by agitating a solution of an N-(2-hydroxyalkyl)-p-aminobenzoate compound wherein Z in the formula given is an arylsulfonyl radical in a suitable water-insoluble organic liquid with an oxidizing mixture of potassium dichromate, acetic acid, water and sulfuric acid at room temperature for several hours and subsequently separating and washing the organic layer and recovering the product as before.

In certain instances, an oily N-(2-ketoalkyl)-p-aminobenzoate compound obtained in the manner just described can be obtained in partially crystalline form by allowing it to stand for several hours. In certain instances it may be desirable to purify the ketoalkyl compound e. g. by preparation and crystallization of a crystalline derivative, such as the semicarbazone, from which the ketoalkyl compound can later be recovered in conventional manner. The crude product obtained from the oxidation mixture, can, however, generally be used without further purification in subsequent reactions. Gentle alkaline hydrolysis of the N-(2-ketoalkyl)-p-aminobenzoate compounds, e. g. with cold aqueous or alcoholic alkali, leads to the formation of the free acid which can be recovered from the alkaline solution in a somewhat oily or solid yellowish form by acidification. The ketoalkyl compounds which are solids can be recrystallized from alcohol.

Certain advantages of the invention are apparent from the following examples which are given by way of illustration only and are not to be construed as limiting.

*Example 1.—Diethyl N' - (N - (p - toluenesulfonyl) - p - aminobenzoyl) - glutamate*

Thirty and nine-tenths grams of p-toluenesulfonyl-p-aminobenzoyl chloride and 23.9 grams of diethyl 1(+)-glutamate hydrochloride were dissolved in 300 milliliters of ethylene dichloride and the solution cooled to between 0° and 10° C. The cold solution was stirred vigorously and 22.3 grams of triethylamine in 72 milliliters of ethylene dichloride was added slowly over a period of about 20 minutes. The temperature of the mixture was held between 10° and 20° C. during the addition of the triethylamine and the mixture then allowed to stand at room temperature for one hour. The mixture was then washed successively with water, dilute hydrochloric acid, saturated aqueous sodium bicarbonate and finally with water. The colorless solution thus obtained was dried with anhydrous sodium sulfate and naphtha was added until the solution became opalescent. The mixture was then cooled to cause crystallization and filtered. The crystals, after drying consisted of 36 grams of diethyl N'-(N-(p - toluenesulfonyl) - p - aminobenzoyl) - l - glutamate melting at 124° to 126° C.

*Example 2.—Diethyl N' - (N - (2 - Hydroxypropyl) - N - (p - toluenesulfonyl) - p - aminobenzoyl) - glutamate*

A mixture of 6.38 grams of propylene oxide, 47.7 grams of diethyl N'-(N-(p-toluenesulfonyl)-p-aminobenzoyl)-glutamate and 10 drops of anhydrous pyridine was heated under pressure at 130° C. for 2 hours. The reaction mixture was then cooled to room temperature, 400 milliliters of benzene were added and the resulting benzene solution was washed with 50 milliliters of water and 50 milliliters of dilute hydrochloric acid and then dried. Removal of the solvent under reduced pressure gave a non-crystalline solid residue of diethyl N'-(N(2-hydroxypropyl)-N-(p-toluenesulfonyl)p-aminobenzoyl)-glutamate.

In a similar manner, and using 1,2-epoxy-n-butane or 1,2-epoxy-4-methyl-n-pentane in place of 1,2-epoxypropane, there are formed diethyl N' - (N - (2 - hydroxy - n - butyl) - N - (p - toluenesulfonyl) - p - aminobenzoyl) - glutamate and diethyl N' - (N - (2 - hydroxy - 4 - methyl-n - pentyl) - N - (p - toluenesulfonyl) - p - aminobenzoyl)-glutamate, respectively, which upon hydrolysis, give the corresponding acids.

The use of ethyl N-(benzenesulfonyl)-p-aminobenzoate or of triethyl N'-(N-(p-chlorobenzenesulfonyl) - p - aminobenzoyl) - glutamyl - glutamate in place of diethyl N'-(N-(p-toluenesulfonyl) - p - aminobenzoyl) - glutamate leads, in analogous manner, to the formation of ethyl N-(2 - hydroxypropyl) - N - (benzenesulfonyl) - p - aminobenzoate and triethyl N'-(N-(2-hydroxypropyl) - N - (p - chlorobenzenesulfonyl) - p - aminobenzoyl) - glutamyl - glutamate, respectively. The latter two esters, upon hydrolysis with dilute alcoholic sodium hydroxide, are converted to N - (2 - hydroxypropyl) - N - (benzenesulfonyl) - p - aminobenzoic acid and N' - (N-(2 - hydroxypropyl) - N - (p - chlorobenzenesulfonyl) - p - aminobenzoyl) - glutamyl - glutamic acid, respectively. The free acids mentioned, upon esterification with an alkanol or with other alkyl ester-forming agents, are converted to the corresponding alkyl esters.

Upon treating the 2-hydroxyalkyl compounds mentioned which are arylsulfonyl derivatives with hydrogen bromide according to the procedure described in the copending application previously referred to, the arylsulfonyl radical is split from the molecule leaving the corresponding 2 - hydroxy - alkylamino compound. The latter, upon reaction with an arylsulfonyl halide in substantially conventional fashion, are converted readily to the corresponding arylsulfonyl derivatives of the amine.

*Example 3.—Diethyl N' - (N - (2 - ketopropyl) - N - (p - toluenesulfonyl) - p - aminobenzoyl) - glutamate*

The crude diethyl N'-(N-(2-hydroxypropyl)-N - (p - toluenesulfonyl) - p - aminobenzoyl)-glutamate obtained in Example 2 was dissolved in 400 milliliters of benzene and the solution was added with vigorous stirring to a solution consisting of 52.6 grams of potassium dichromate, 230 milliliters of water, 38 milliliters of acetic acid and 69 milliliters of sulfuric acid. The mixture was stirred vigorously at 20° to 25° C. for about 2½ hours, cooled and the benzene and aqueous layers separated. The aqueous layer was extracted twice with 100-milliliter portions of benzene and then discarded, the benzene extracts being added to the benzene layer from the reaction mixture. The combined benzene solutions were washed three times with 250-milliliter portions of water, once with 100 milliliters of saturated aqueous sodium bicarbonate solution, twice with 250-milliliter portions of water and once with 100 milliliters of saturated aqueous sodium chloride solution. The washed benzene solution was then dried and the solvent distilled under reduced pressure. The residue was dissolved in hot iso-propanol and the solution allowed to crystallize at room temperature. The mixture was filtered and the crystals dried. There were thus obtained 34.5 grams of crude diethyl N'-(N-(2 - ketopropyl) - N - (p - toluenesulfonyl) - p-aminobenzoyl)-glutamate which melted at 88° to 130° C. Recrystallization of the crude ketone raised its melting point to 99° to 125° C. In an alternate procedure, diethyl N'-(N-(2-hydroxypropyl) N - (p - toluenesulfonyl) - p - aminobenzoyl)-glutamate and a small excess over the theoretical amount of chromic anhydride are dissolved in glacial acetic acid and the mixture allowed to stand for several hours with occasional agitation at about 5° to 10° C. The mixture is then stirred with ether and filtered. The ethereal solution is washed with water and aqueous bicarbonate, dried and the ether evaporated under reduced pressure. Diethyl N'-(N-(2-ketopropyl) - N - (p - toluenesulfonyl) - p - aminobenzoyl)-glutamate is thus obtained as a yellowish viscous residue which can be purified as previously described.

A solution of 31.0 grams of crude diethyl N'-(N-(2 - ketopropyl) - N - (p - toluenesulfonyl)-p-aminobenzoyl)-glutamate, 11.1 grams of semicarbazide hydrochloride and 9.0 grams of sodium acetate in a mixture of 200 milliliters of ethanol and 50 milliliters of water was heated under reflux for 2 hours, cooled and diluted with water. Upon crystallizing and filtering there were obtained 16.2 grams of the semicarbazone of diethyl N' - (N-(2-ketopropyl)-N-(p-toluenesulfonyl)-p-aminobenzoyl)-glutamate which melted at 108° to 119° C. Several recrystallizations of the crude semicarbazone from iso-propanol raised its melting point to 118° to 124° C.

Anal:
  Calcd. for $C_{27}H_{35}N_5O_8S$: C, 54.9; H, 5.98; N, 11.9.
  Found: C, 55.0; H, 6.27; N, 11.6.

A mixture of 18.2 grams of the semicarbazone of diethyl N'-(N-(2-ketopropyl)-N-(p-toluenesulfonyl)-p-aminobenzoyl)-glutamate, 75 milliliters of benzene, 35 milliliters of ethanol, 85 milliliters of water and 17 milliliters of concentrated aqueous hydrochloric acid was heated under reflux for 2 hours. The organic water-insoluble layer was separated and washed twice with equal volumes of water, once with an equal volume of saturated aqueous sodium bicarbonate solution and once with an equal volume of saturated aqueous sodium chloride solution and then dried. Upon distilling the benzene under reduced pressure, an oily residue was obtained which was recrystallized from iso-propyl alcohol. There were thus obtained 13.6 grams of pure diethyl N'-(N-(2-ketopropyl)-N-(p-toluenesulfonyl)-p-aminobenzoyl)-glutamate melting at 103° to 106° C.

Oxidation in a similar manner of diethyl N'-(N-(2-hydroxy-n-butyl)-N-(p-toluenesulfonyl)-p-aminobenzoyl)-glutamate, diethyl N'-(N-(2-hydroxy-4-methyl-n-pentyl)-N-(p-toluenesulfonyl)-p-aminobenzoyl)-glutamate, N'-(N-(2-hydroxy-n-butyl)-N-(p-toluenesulfonyl)-p-aminobenzoyl)-glutamic acid, N-(2-hydroxypropyl)-N-(benzenesulfonyl)-p-aminobenzoic acid, ethyl N-(2-hydroxypropyl)-N-(benzenesulfonyl)-p-aminobenzoate, triethyl N' - (N - (2 - hydroxypropyl)-N-(p-chlorobenzenesulfonyl)-p-aminobenzoyl)-glutamyl-glutamate and N'-(N-(2-hydroxypropyl) - N - (p - chlorotoluenesulfonyl)-p-aminobenzoyl)-glutamyl-glutamic acid gives diethyl N' - (N-(2-keto-n-butyl)-N-(p-toluenesulfonyl)-p-aminobenzoyl)-glutamate, diethyl N'-(N-(2-keto-4-methyl-n-pentyl) - N - (p-toluenesulfonyl)-p-aminobenzoyl)-glutamate, N'-(N-(2-keto-n-butyl)-N-(p-toluenesulfonyl)-p-aminobenzoyl) - glutamic acid, N - (2 - ketopropyl)-N-(benzenesulfonyl) - p - aminobenzoic acid, ethyl N-(2-ketopropyl)-N-(benzenesulfonyl)-p-aminobenzoate, triethyl N'-(N-(2-ketopropyl)-N-(p-chlorobenzenesulfonyl) - p - aminobenzoyl)-glutamyl-glutamate and N'-(N-(2-ketopropyl)-N-(p-chlorotoluenesulfonyl)-p-aminobenzoyl)-glutamyl-glutamic acid, respectively.

*Example 4.—Diethyl N' - (N - (2 - ketopropyl)-p-aminobenzoyl)-glutamate*

A mixture consisting of about 0.5 gram of diethyl N' - (N-(2-ketopropyl)-N-(p-toluenesulfonyl) - p - aminobenzoyl-glutamate, 0.235 gram of phenol and 5 milliliters of a 25 per cent solution of hydrogen bromide in glacial acetic acid is prepared and allowed to stand at room temperature for about 2 hours and then poured into 35 milliliters of dry ether. The mixture is filtered and the residue washed with dry ether and then dried. There is thus obtained a residue of diethyl N'-(N-(2-ketopropyl) - p - aminobenzoyl)-glutamate hydrobromide. Upon stirring the compound with aqueous sodium bicarbonate solution, extracting the mixture with benzene, drying the benzene extract and evaporating the benzene, there is obtained an oily residue of diethyl N'-(N-(2-ketopropyl)-p-aminobenzoyl)-glutamate which forms a solid semicarbazone.

In a similar manner the arylsulfonyl radical is split from diethyl N'-(N-(2-keto-n-butyl)-N-(p-toluenesulfonyl)-p-aminobenzoyl)-glutamate, diethyl N' - (N-(2-keto-4-methyl-n-pentyl)-N-(p-toluenesulfonyl) - p - aminobenzoyl) - glutamate, N'-(N-(2-keto-n-butyl) - N-(p-toluenesulfonyl)-p-aminobenzoyl)-glutamic acid, N-(2-ketopropyl)-N-(benzenesulfonyl)-p - aminobenzoic acid, ethyl N - (2-ketopropyl)-N-(benzenesulfonyl)-p-aminobenzoate, N'-(N-(2 - ketopropyl) - N - (p-chlorobenzenesulfonyl) - p - aminobenzoyl)-glutamyl-glutamic acid and triethyl N'-(N-(2-ketopropyl)-N-(p-chlorobenzenesulfonyl)-p - aminobenzoyl)-glutamyl-glutamate to form diethyl N'-(N-(2-keto-n-butyl) - p - aminobenzoyl) - glutamate, diethyl N'-(N-(2-keto-4-methyl-n-pentyl)-p-aminobenzoyl)-glutamate, N' - (N - (2-keto-n-butyl)-p-aminobenzoyl)-glutamic acid, N - (2-ketopropyl)-p-aminobenzoic acid, ethyl N-(2-ketopropyl) - p - aminobenzoate, N' - (N-(2-ketopropyl)-p - aminobenzoyl) - glutamyl - glutamic acid and triethyl N'-(N-(2-ketopropyl)-p-aminobenzoyl)glutamyl-glutamate, respectively.

In a similar manner, also, the arylsulfonyl radical is split from diethyl N'-(N-(2-hydroxy-n-butyl)-N-(p - toluene - sulfonyl)-p-aminobenzoyl)-glutamate, diethyl N'-(N-(2-hydroxy-4-methyl-n-pentyl)-N-(p-toluenesulfonyl) - p - aminobenzoyl)-glutamate, N'-(N-(2-hydroxy-n-butyl)-N-(p-toluenesulfonyl)-p-aminobenzoyl) - glutamic acid, N-(2-hydroxypropyl)-N-(benzenesulfonyl)-p-aminobenzoic acid, ethyl N-(2-hydroxypropyl)-N-(benzenesulfonyl) - p - aminobenzoate, N'-(N-(2-hydroxypropyl) - N - (p - chlorobenzenesulfonyl)-p-aminobenzoyl) - glutamyl - glutamic acid and triethyl N' - (N - (2 - hydroxypropyl)-N-(p-chlorobenzenesulfonyl) - p - aminobenzoyl) - glutamyl-glutamate to form diethyl N'-(N-(2-hydroxy-n-butyl)-p-aminobenzoyl)-glutamate, diethyl N' - (N-(2-hydroxy-4-methyl-n-pentyl)-p-aminobenzoyl)-glutamate, N'-(N-(2-hydroxy-n-butyl)-p-aminobenzoyl)-glutamic acid, N-(2-hydroxypropyl)-p-amino-benzoic acid, ethyl N-(2-hydroxypropyl)-p-aminobenzoate, N'-(N-(2-hydroxypropyl) - p - aminobenzoyl)-glutamyl-glutamic acid and triethyl N'-(N-(2-hydroxypropyl) - p - aminobenzoyl)-glutamyl-glutamate, respectively.

We claim:

1. The method which includes reacting a compound having the formula

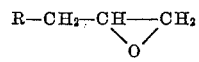

wherein R is a member of the class consisting of hydrogen and the alkyl radicals with a compound having the formula

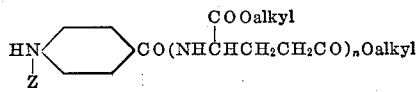

wherein $n$ is a member of the class consisting of zero and the positive integer 1, and Z is a member of the class consisting of hydrogen and the arylsulfonyl radicals to form an hydroxyalkyl ester having the formula

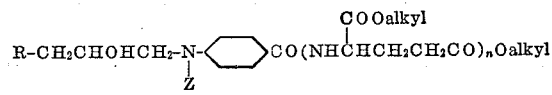

R, $n$ and Z having the values given.

2. The method of claim 1 wherein R is hydrogen.

3. The method of claim 1 wherein $n$ is the integer 1.

4. The method of claim 1 wherein Z is hydrogen.

5. The method of claim 1 wherein Z is an arylsulfonyl radical.

6. The method of claim 1 wherein Z is the p-toluenesulfonyl radical.

7. The method of claim 1 wherein the reaction is carried out with the aid of a catalytic amount of a tertiary amine.

8. The method which includes reacting a compound having the formula

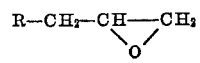

wherein R is selected from the class consisting of hydrogen and the alkyl radicals with a compound having the formula

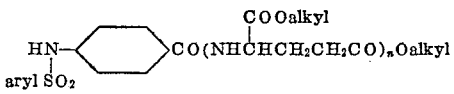

wherein $n$ is a member of the class consisting of zero and the positive integer 1 to form an hydroxyalkyl ester having the formula

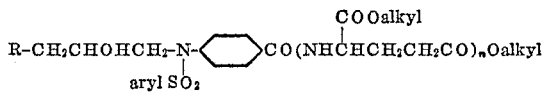

and subsequently oxidizing the hydroxyalkyl ester with a chromic compound in a substantially entirely organic reaction medium to form predominantly a ketoalkyl ester having the formula

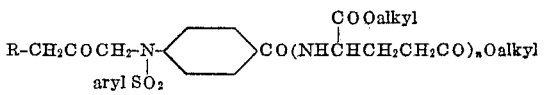

R and $n$ having the values given.

9. The method of claim 8 wherein the arylsulfonyl radical is the p-toluenesulfonyl radical.

10. The method of claim 8 wherein the chromic compound is chromic anhydride and the reaction medium is acetic acid.

11. The method which includes reacting a compound having the formula

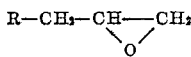

wherein R is selected from the class consisting of hydrogen and the alkyl radicals with a compound having the formula

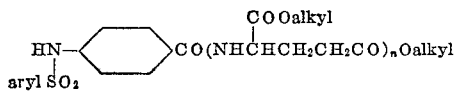

wherein $n$ is a member of the class consisting of zero and the positive integer 1 to form an hydroxyalkyl ester having the formula

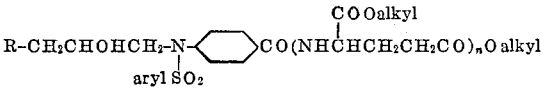

subsequently oxidizing the hydroxyalkyl ester with a chromic compound in a substantially entirely organic reaction medium to form predominantly a ketoalkyl ester having the formula

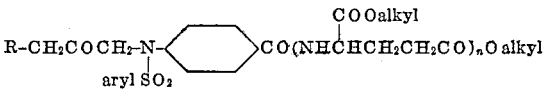

and hydrolyzing the ketoalkyl ester to form a ketoalkyl acid having the formula

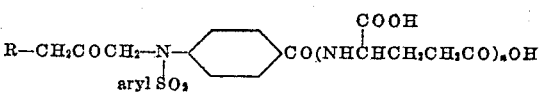

R and $n$ having the values given.

12. The method which includes reacting a compound having the formula

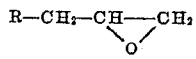

wherein R is selected from the class consisting of hydrogen and the alkyl radicals with a compound having the formula

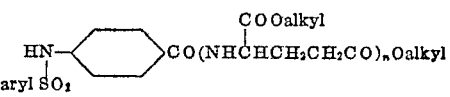

wherein $n$ is a member of the class consisting of zero and the positive integer 1 to form an hydroxyalkyl ester having the formula

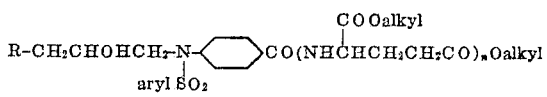

hydrolyzing the hydroxyalkyl ester to the free acid and oxidizing the acid with a chromic compound in a substantially entirely organic reaction medium to form predominantly a ketoalkyl acid having the formula

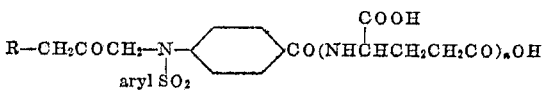

R and $n$ having the values given.

13. A compound having the formula

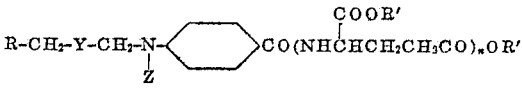

wherein R' is a member of the class consisting of hydrogen and the alkyl radicals, $n$ is a member of the class consisting of zero and the positive integer 1, Z is a member of the class consisting of hydrogen and the arylsulfonyl radicals, R is a member of the class consisting of hydrogen and the alkyl radicals and Y is a member of the class consisting of radicals having the formulae —CHOH— and —CO—.

14. Diethyl N'-(N-(2-hydroxypropyl)-N-(p-toluenesulfonyl)-p-aminobenzoyl)-glutamate.

15. Diethyl N'-(N-(2-ketopropyl)-N-(p-toluenesulfonyl)-p-aminobenzoyl)-glutamate.

DAVID I. WEISBLAT.
BARNEY J. MAGERLEIN.

No references cited.